United States Patent Office 2,734,050
Patented Feb. 7, 1956

2,734,050

SULFURIZED CONDENSATION PRODUCTS AND PROCESS OF MAKING SAME

Emil Schwamberger, Frankfurt am Main-Fechenheim, Germany, assignor to Cassella Farbwerke Mainkur Aktiengesellschaft, Frankfurt am Main-Fechenheim, Germany, a German company No Drawing. Application June 30, 1950,
Serial No. 171,542

Claims priority, application Germany July 13, 1949

6 Claims. (Cl. 260—131)

This invention relates to sulfurized condensation products and to a process of making same.

It is already known in the art that by treating aromatic compounds with aluminium chloride and sulfur dioxide, sulfinic acids can be produced. In this process inert solvents are generally used at lower temperatures f. i. 0° C., but only compounds of the benzene and naphthalene series can be thus converted into sulfinic acids.

A quite different reaction of aluminium chloride and sulfur dioxide is described in the German patent specification 746,546. According to this specification compounds of the anthraquinone series containing secondary amino groups substituted by aromatic radicals (anthrimides) are transformed by means of aluminium chloride and sulfur dioxide into vat dyestuffs. Thereby a carbazole ring closure takes place, but no sulfur enters the molecule.

Now I have found that sulfur can be introduced also into higher condensed ring systems by means of aluminium chloride and sulfur dioxide, when nitrogen-free quinones containing six condensed benzene rings and eventually rings of five carbon atoms are treated in molten aluminium chloride with sulfur dioxide. As starting materials may be named: dibenzopyrenquinone, isodibenzopyrenquinone, anthanthrone and acedianthrone.

By the process of the present invention, compounds of a varying content of sulfur are obtainable depending upon the reaction conditions used. These new compounds represent mostly fast dyeing vat dyestuffs, suitable also for textile printing. Some others of these compounds can be converted into vat dyestuffs by means of known methods. Also mixtures of isomeres or of compounds containing varying amounts of sulfur, are obtainable in this way. The components of these mixtures may be isolated in the known ways.

A special modification of the present process consists in preparing the starting material for this process in the molten aluminium chloride and then converting it without being isolated into the sulfurized compounds according to the present process.

Some of the new compounds produced according to the present invention can be transformed by alkylation f. i. methylation into new dyestuffs exhibiting an enhanced fastness to washing. In this case the sulfur seems to be present in the molecule as a sulfinic acid residue. But by the present process dyestuffs of so good a fastness to boiling are obtainable, too, that they seem to be no sulfinic acids but probably sulfoxides or sulfones. It depends upon the special reaction conditions, how much sulfur enters the molecule and how it is bound therein. Therefore different condensation products are obtainable from the same starting material by a suitable variation of the reaction conditions.

During this process halogen atoms present in the starting material are generally maintained in the molecule and may be used for subsequent reactions. On the other hand chlorine atoms may enter the final molecule according to the reaction conditions and starting materials used.

The reaction may be carried out by means of aluminium chloride or by the mixture of it with sodium or potassium chloride. The molten mixture contains partially the molecular compounds of aluminium chloride and sulfur dioxide which are described in the German Patent 746,546. A portion of sulfur dioxide may also be replaced by alkali bisulfite or a portion of aluminium chloride by similar condensation agents as f. i. ferric chloride.

The following examples illustrate the invention but are not intended to limit it thereto. The parts are by weight and the temperatures in Centigrade degrees.

Example 1

Into a molten mass of 200 parts of aluminium chloride and 33 parts of sodium chloride, 40 parts of anthanthrone are introduced at 140–150°, while sulfur dioxide is passed through the mass and it is stirred for about 6 hours. By pouring the mass onto ice, a violet brown product is obtained dyeing cotton from a purple red vat fast violet brown shades. By boiling in solvents of a high boiling point the dyestuff may be purified. It contains about 8% of sulfur and about 8% of chlorine. The color of its solution in concentrated sulfuric acid is moss green.

Example 2

Into a molten mass prepared according to Example 1, 20 parts of anthanthrone are introduced at 150–160° and the whole is further treated as described above. In this way a chocolate brown vat dyestuff containing sulfur is obtained. Its vat shows a more violet shade and its solution in sulfuric a more blueish olive shade than the product of the foregoing example. The dyestuff contains about 11% of sulfur and about 17% of chlorine. By treating it with alkylating agents, f. i. with p-toluene-sulfonic acid methylester in nitrobenzene, this dyestuff can be converted into vat dyestuffs dyeing reddish to brownish gray shades. When dibromanthanthrone is used instead of anthanthrone, dyestuffs of similar shades are obtained.

Example 3

Into a molten mass of 200 parts of aluminium chloride and 33 parts of sodium chloride 20 parts of dibenzopyrenquinone are introduced at 140–150° and stirred for about 5 hours while sulfur dioxide passes through. After pouring onto ice a vat dyestuff is obtained, dyeing cotton from a violet vat light reddish brown shades of good fastness properties. The color of its solution in concentrated sulfuric acid is clear blue.

When dibenzopyrenquinone is replaced by isodibenzopyrenquinone, a violet brown dyeing vat dyestuff is obtained.

Example 4

A mixture of 200 parts of aluminium chloride and 33 parts of sodium chloride is liquified by passing sulfur dioxide over it at a temperature of 154–150°. Then 40 parts of dianthronethane (obtained according to German Patent 453,768) are introduced into the molten mass during about 2 hours and the whole is further stirred for 2 hours. After pouring the mass onto ice a vat dyestuff dyeing intense dark brown shades, is obtained. The color of its vat is violet brown, that of the solution of the dyestuff in concentrated sulfuric acid is blueish violet.

The same dyestuff is obtainable by treating acedianthrone (prepared according to Example 1 of German Patent 576,466) in a molten mixture of aluminium chloride and sulfur dioxide at 140–150°.

Example 5

Dibenzopyrenquinone is prepared by treating 1.5-dibenzoylnaphthalene in molten aluminium sodium chloride while passing air through the mass at 120–130° (according to Example 5 of German Patent 518,316). Then the temperature is raised to 150° and sulfur dioxide instead of air is passed through the molten mass. In this manner a product is obtained which contains sulfur and consists mainly of the dyestuff described in Example 3.

*Example 6*

A mixture of 200 parts of aluminium chloride and 33 parts of sodium chloride is liquified at 80–85° by passing sulfur dioxide over it. Then 40 parts of dianthrone ethane (prepared according to German Patent 463,768) are introduced during about 2 hours. The mass is further agitated for 1 or 2 hours until no more starting material can be found. Subsequently the mass is poured onto ice and the dyestuff precipitated is filtered off and washed. The dyestuff thus obtained contains 4.5% sulfur whereas the dyestuff obtainable according to Example 3 contains 8–9% sulfur.

This product is especially suitable for textile printing. Thereby prints are obtained showing dark reddish brown shades, which are essentially brighter and more reddish than the prints prepared by means of the product of Example 4. The prints exhibit excellent fastness properties.

The same dyestuff is obtainable when instead of gaseous sulfurous acid, alkali bisulfite is used for the aluminium chloride reaction.

I claim:

1. A process of preparing sulfur-containing vat dyestuffs, which comprises heating a nitrogen-free compound of the group consisting of quinones having six condensed benzene nuclei and such quinones also having 2 five-membered carbon rings with aluminum chloride and a sulfurizing agent of the group consisting of sulfur dioxide and alkali bisulfites.

2. A process as claimed in claim 1, wherein the resultant sulfur-containing condensation product is treated with an alkylating agent.

3. A process of preparing a sulfur-containing vat dyestuff, which comprises heating dianthrone ethane with aluminum chloride, sodium chloride and sulfur dioxide.

4. A sulfur-containing vat dyestuff obtained according to the process of claim 1.

5. A sulfur-containing, alkylated vat dyestuff obtained according to the process of claim 2.

6. The sulfur-containing vat dyestuff obtained according to the process of claim 3.

References Cited in the file of this patent
FOREIGN PATENTS

| | | |
|---|---|---|
| 321,843 | Great Britain | 1929 |
| 746,546 | Germany | 1943 |